United States Patent
Oh et al.

(10) Patent No.: US 9,945,449 B2
(45) Date of Patent: Apr. 17, 2018

(54) MULTI-SPEED TRANSMISSION

(71) Applicant: Ford Global Technologies, LLC, Dearborn, MI (US)

(72) Inventors: David Gon Oh, Ann Arbor, MI (US); Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 14/923,571

(22) Filed: Oct. 27, 2015

(65) Prior Publication Data

US 2017/0114866 A1 Apr. 27, 2017

(51) Int. Cl.
*F16H 3/62* (2006.01)
*F16H 3/44* (2006.01)
*F16H 37/06* (2006.01)
*F16H 3/66* (2006.01)

(52) U.S. Cl.
CPC ........ *F16H 3/66* (2013.01); *F16H 2200/0069* (2013.01); *F16H 2200/2012* (2013.01); *F16H 2200/2043* (2013.01); *F16H 2200/2046* (2013.01); *F16H 2200/2097* (2013.01)

(58) Field of Classification Search
CPC ................ F16H 2200/2012; F16H 2200/2048
See application file for complete search history.

(56) References Cited

U.S. PATENT DOCUMENTS

| | | | |
|---|---|---|---|
| 7,722,496 B2 | 5/2010 | Phillips et al. | |
| 8,052,566 B2 | 11/2011 | Wittkopp et al. | |
| 8,202,190 B2 | 6/2012 | Phillips et al. | |
| 8,231,495 B2 | 7/2012 | Gumpoltsberger et al. | |
| 8,663,053 B2 | 3/2014 | Beck et al. | |
| 8,727,929 B2 | 5/2014 | Beck et al. | |
| 2014/0024488 A1* | 1/2014 | Goleski | F16H 3/66 475/275 |
| 2014/0256498 A1* | 9/2014 | Lippert | F16H 3/62 475/275 |
| 2014/0296022 A1* | 10/2014 | Janson | F16H 3/46 475/282 |
| 2015/0099603 A1* | 4/2015 | Goleski | F16H 3/62 475/275 |

FOREIGN PATENT DOCUMENTS

WO 2015034057 A1 3/2015

* cited by examiner

*Primary Examiner* — Tisha D Lewis
(74) *Attorney, Agent, or Firm* — James Dottavio; Brooks Kushman P.C.

(57) ABSTRACT

A transmission gearing arrangement has four simple planetary gear sets and six shift elements. The six shift elements are engaged in combinations of three to establish ten forward speed ratios and one reverse speed ratio. A four clutch module selectively couples an intermediate shaft to four different gearing elements. One shift element is a brake.

17 Claims, 2 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

Figure 1:
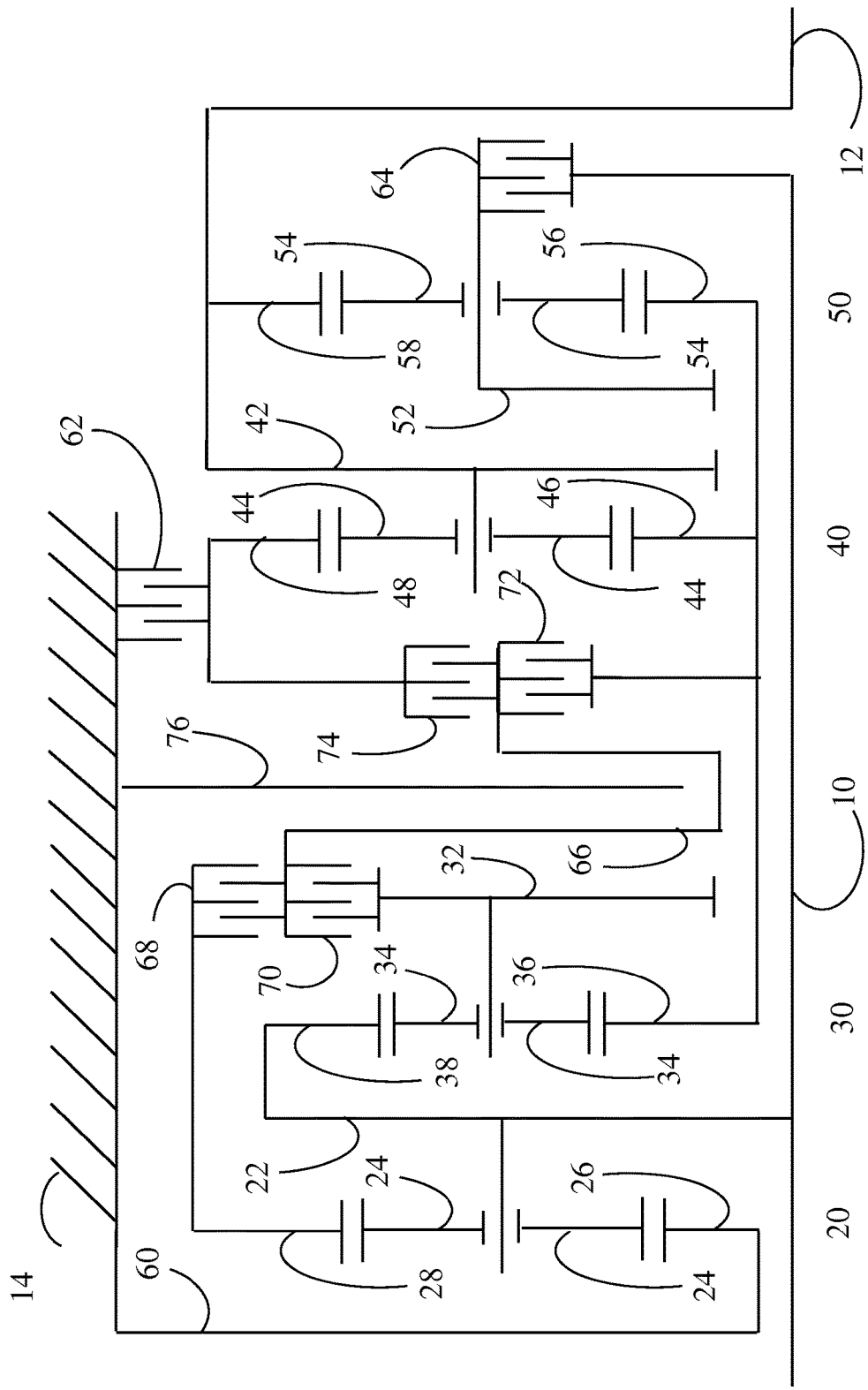
FIG. 1 is a schematic diagram of a first transmission gearing arrangement.

A transmission includes gearing arrangements and shift elements. A first gearing arrangement selectively imposes an overdrive speed relationship between an input and a first shaft. The first gearing arrangement may be, for example, a planetary gear set with a stationary sun, a carrier fixedly coupled to the input, and the ring selectively coupled to the first shaft. A second gearing arrangement fixedly imposes a linear speed relationship among the input, a second shaft, and a third shaft. The second gearing arrangement may be, for example, a planetary gear set with a sun as the third shaft, a carrier as the second shaft, and a ring fixedly coupled to the input. A third gearing arrangement fixedly imposes a linear speed relationship among a fourth shaft, an output, a fifth shaft, and the third shaft. The third gearing arrangement may be, for example, two simple planetary gear sets. Three clutches selectively couple the first shaft to the second, third, and fourth shafts respectively. Another clutch selectively couples the input to the fifth shaft. A brake selectively holds the fourth shaft against rotation.

A transmission includes gearing a four clutches. The gearing fixedly imposes a number of specified speed relationships including a proportional speed relationship between an input and a first shaft, a linear speed relationship among the input, a second shaft, and a third shaft, and a linear speed relationship among the third shaft, an output, and a fourth shaft. The four clutches selectively couple a fifth shaft to each of the first, second, third, and fourth shafts. The transmission may also include additional gearing selectively establishing a linear speed relationship among the third shaft, the input, and the output. For example, the additional gearing may be a simple planetary gear set with a sun as the third shaft, a carrier selectively coupled to the input, and a ring fixedly coupled to the output. As another example, the additional gearing may be a simple planetary gear set with a sun as the third shaft, a carrier fixedly coupled to the input, and a ring selectively coupled to the output. A brake may selectively hold the fourth shaft against rotation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate at the same speed about the same axis in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate at the same speed about the same axis whenever it is fully engaged and they have different rotational speeds about that axis in at least some other operating condition. A shift element that holds a rotating element against rotation by selectively coupling it to a fixed housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes. Shift elements may be positive engagement devices such as dog clutches or friction devices capable of transmitting torque between elements in the presence of relative rotation. Two elements are coupled if they are either fixedly coupled or selectively coupled.

A gearing arrangement is a collection of gearing elements and shift elements configured to impose specified speed relationships among a set of shafts. A speed relationship is fixedly imposed by a gearing arrangement if it is imposed regardless of the state of any shift elements. A speed relationship is selectively imposed by a gearing arrangement if the speed relationship is imposed only when particular shift elements of the gearing arrangement are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts with predetermined weightings, and iii) when the speeds of the shafts differ, they are constrained to be in the listed order, either increasing or decreasing.

FIG. 1 depicts a transmission that provides ten forward speed ratios and one reverse speed ratio between input 10 and output 12. Input 10 may be driven by an internal combustion engine or other prime mover. A launch device such as a torque converter or launch clutch may be employed between the prime mover and input 10 permitting the engine to idle while the vehicle is stationary and a transmission ratio is selected. Output 12 drives the vehicle wheels, preferably via a differential that allows a slight speed difference between left and right wheels while the vehicle goes around a corner. The gearing and shift elements are supported within a transmission case 14 that is fixed to vehicle structure.

The transmission of FIG. 1 utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured. A simple planetary gear set is a type of gearing arrangement that fixedly imposes a linear speed relationship among the sun gear, the planet carrier, and the ring gear. Other known types of gearing arrangements also impose a fixed linear speed relationship among three rotating elements. A suggested ratio of gear teeth for each planetary gear set is listed in Table 1.

TABLE 1

| Ring 28/Sun 26 | 2.20 |
| Ring 38/Sun 36 | 1.60 |
| Ring 48/Sun 46 | 4.09 |
| Ring 58/Sun 56 | 3.62 |

Sun gear 26 is fixedly held against rotation by front support 60 which is fixed to transmission case 14. Carrier 22 and ring gear 38 are fixedly coupled to input 10. Sun gear 36, sun gear 46, and sun gear 56 are mutually fixedly coupled forming a shaft. Carrier 42 and ring gear 58 are fixedly coupled to output 12. Brake 62 selectively couples ring gear 48 to housing 14 to selectively hold it against rotation. Input 10 is selectively coupled to carrier 52 by clutch 64. Intermediate shaft 66 is not fixedly coupled to any gearing elements but is selectively coupled to ring gear 28 by clutch 68, selectively coupled to carrier 32 by clutch 70, selectively coupled to the combination of sun gear 36, sun gear 46, and sun gear 56 by clutch 72, and selectively coupled to ring gear 48 by clutch 74.

Shift elements 62, 64, 68, 70, 72, and 74 may be hydraulically controlled multi-plate wet friction clutches or brakes. The torque capacity of a hydraulically controlled shift element is adjusted by adjusting the pressure of a fluid which is routed to an apply chamber. When the fluid is at high pressure, the fluid pushes a piston against a clutch pack. For brakes, the fluid may be routed to the apply chamber through channels formed in the fixed transmission case. For clutches, the fluid must also be routed through rotating elements. Providing a large number of channels through rotating elements complicates the design of those elements. Seals are used to route pressurized fluid from the stationary transmission case 14 to a rotating element or from one rotating element to another. Since these transitions require packaging space and present potential failure modes, it is desirable to minimize the number of transitions. Routing fluid to clutch 64 requires only a single transition from front support 60 to input 10. Similarly, fluid may be routed to clutches 68, 70, 72, and 74 with a single transition from center support 76 to intermediate shaft 66.

When the clutch housing rotates, centrifugal forces tend to pressurize the fluid in the apply chamber. This pressure could potentially cause a clutch to engage when not commanded or could increase the clutch capacity beyond the commanded capacity. To mitigate this phenomenon, clutches may include a balance chamber which is supplied with unpressurized fluid. When the clutch housing rotates, centrifugal forces tend to pressurize the fluids in the balance chamber counteracting the pressurization in the apply chamber. It is advantageous to group clutches into a common housing because only one fluid passageway is required to provide the unpressurized fluid to the common housing, reducing the number of transitions required relative to separate housings for each clutch.

Various subsets of the gearing arrangement of FIG. 1 impose particular speed relationships. Gear set 20 fixedly imposes a proportional speed relationship, specifically an overdrive speed relationship, between input 10 and ring gear 28. Other gearing arrangements, such as layshaft gearing arrangements, fixedly impose overdrive speed relationships. The combination of gear set 20 and clutch 68 selectively impose an overdrive speed relationship between input 10 and shaft 66. The combination of gear set 30 and clutch 70 selectively impose a linear speed relationship among input 10, intermediate shaft 66, and the combination of sun gear 36, sun gear 46, and sun gear 56. The combination of gear set 40 and gear set 50 fixedly impose a linear speed relationship among ring gear 48, the output, carrier 52, and the combination of sun gear 36, sun gear 46, and sun gear 56. Other combinations of two planetary gear sets with appropriate interconnections establish similar linear speed relationships among four shafts. The combination of gear set 50 and clutch 64 selectively impose a linear speed relationship among output 12, input 10, and the combination of sun gear 36, sun gear 46, and sun gear 56.

As shown in Table 2, engaging the shift elements in combinations of three establishes ten forward speed ratios and one reverse speed ratio between input 10 and output 12. An X indicates that the shift element is required to establish the power transfer path. An (X) indicates that the shift element may be engaged in that speed ratio but is not required to establish the power transfer path. For example, brake 62 and clutch 64 are sufficient to establish the power flow path associated with 4th gear. Any one of the remaining shift element may be engaged. Engaging clutch 68 is suggested because that permits making most shifts with only one oncoming and one off-going shift element. When the gear sets have tooth numbers as indicated in Table 1, the speed ratios have the values indicated in Table 2.

TABLE 2

|      | 62 | 64 | 68  | 70 | 72 | 74 | Ratio | Step |
|------|----|----|-----|----|----|----|-------|------|
| Rev  | X  |    |     | X  |    | X  | −3.18 | 63%  |
| 1st  | X  |    |     | X  | X  |    | 5.09  |      |
| 2nd  | X  |    | X   |    | X  |    | 3.50  | 1.46 |
| 3rd  | X  |    | X   | X  |    |    | 2.33  | 1.50 |
| 4th  | X  | X  | (X) |    |    |    | 1.89  | 1.24 |
| 5th  |    | X  | X   | X  |    |    | 1.49  | 1.27 |
| 6th  |    | X  | X   |    | X  |    | 1.14  | 1.30 |
| 7th  |    | X  |     |    | X  | X  | 1.00  | 1.14 |
| 8th  |    | X  | X   |    |    | X  | 0.82  | 1.21 |
| 9th  |    |    | X   |    | X  | X  | 0.69  | 1.20 |
| 10th |    |    | X   | X  |    | X  | 0.63  | 1.10 |

In operation, brakes 62 and clutch 70 may be engaged while the vehicle is in park. If the driver then selects reverse, clutch 64 is engaged. If the driver shifts from park to drive, clutch 72 is engaged. All single and two step shifts are accomplished by gradually releasing one shift element while gradually engaging another shift element. Alternate combinations of three are available for the direct drive ratio (7th gear).

Figure 2:
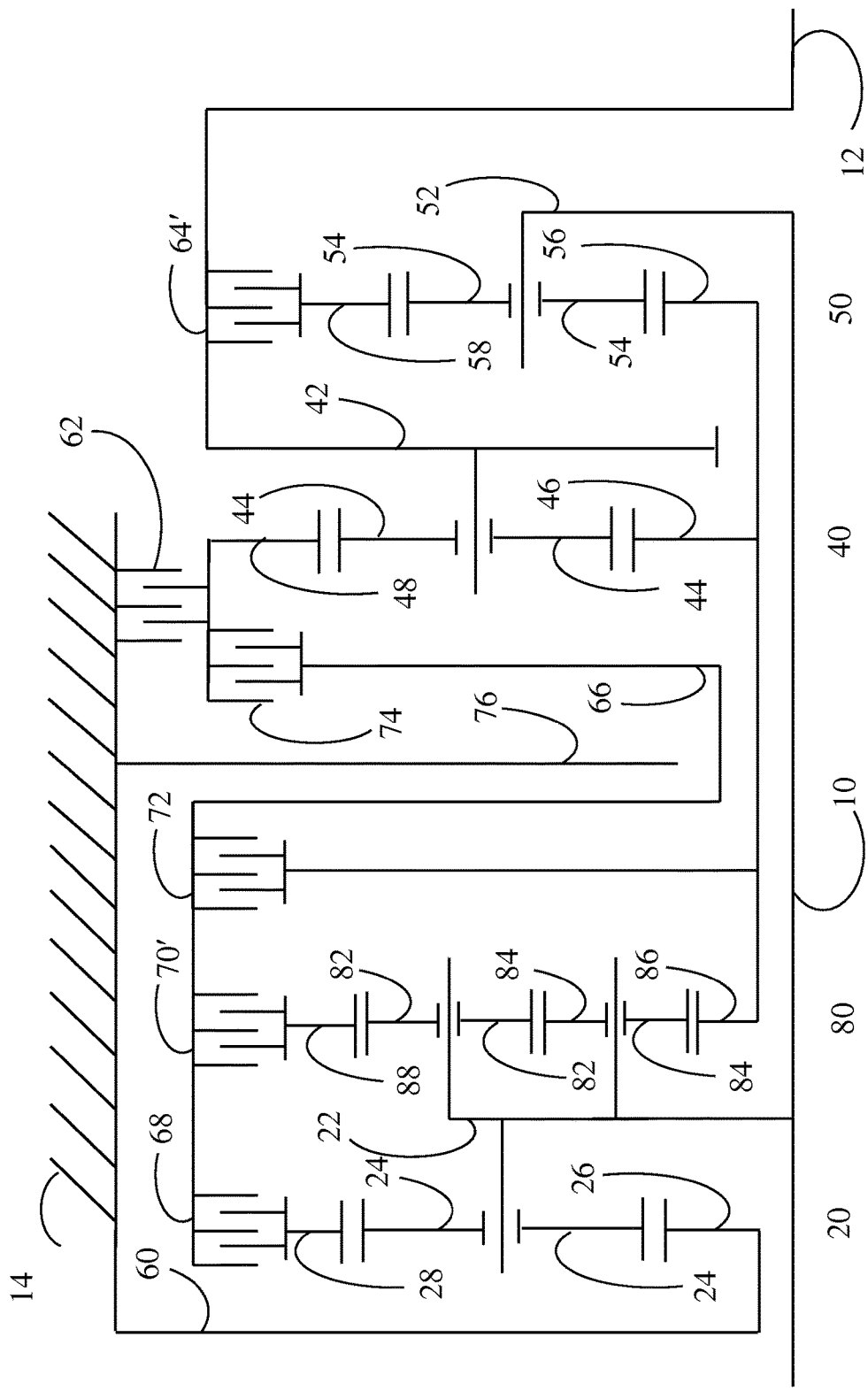
FIG. 2 is a schematic diagram of a second transmission gearing arrangement.

FIG. 2 depicts a transmission that provides ten forward and one reverse speed ratios between input 10 and output 12. The transmission of FIG. 2 utilizes three simple planetary gear sets 20, 40, and 50. Gear set 80 is a double pinion planetary gear set. Gear set 80 shares a common carrier 22 with planetary gear set 20. Planet carrier 22 supports a set of outer planet gears 82 and a set of inner planet gears 84 such that the planet gears rotate with respect to the planet carrier. Each inner planet gear 84 meshes with sun gear 86. Each outer planet gear 82 meshes with one inner planet gear 84 and also with ring gear 88. External gear teeth on the planet gears mesh with external gear teeth on a sun gear 26 and with internal gear teeth on a ring gear 28. A double pinion planetary gear set is a type of gearing arrangement that fixedly imposes a linear speed relationship among the sun gear, the ring gear, and the planet carrier. A suggested ratio of gear teeth for each planetary gear set is listed in Table 3.

TABLE 3

| Ring 28/Sun 26 | 2.20 |
| Ring 88/Sun 86 | 2.60 |
| Ring 48/Sun 46 | 4.09 |
| Ring 58/Sun 56 | 3.62 |

Sun gear 26 is fixedly held against rotation by front support 60 which is fixed to transmission case 14. Shared carrier 22 and carrier 52 are fixedly coupled to input 10. Sun gear 86, sun gear 46, and sun gear 56 are mutually fixedly coupled forming a shaft. Carrier 42 is fixedly coupled to output 12. Brake 62 selectively couples ring gear 48 to housing 14. Output 12 is selectively coupled to ring gear 58 by clutch 64'. Intermediate shaft 66 is not fixedly coupled to any gearing elements but is selectively coupled to ring gear 28 by clutch 68, selectively coupled to ring gear 88 by clutch 70', selectively coupled to the combination of sun gear 86, sun gear 46, and sun gear 56 by clutch 72, and selectively coupled to ring gear 48 by clutch 74.

Various subsets of the gearing arrangement of FIG. 2 impose particular speed relationships. Gear set 20 fixedly imposes an overdrive speed relationship between input 10 and ring gear 28. The combination of gear set 20 and clutch 68 selectively impose an overdrive speed relationship between input 10 and shaft 66. The combination of gear set 80 and clutch 70' selectively impose a linear speed relationship among input 10, shaft 66, and the combination of sun gear 86, sun gear 46, and sun gear 56. The combination of gear set 50 and clutch 64' selectively impose a linear speed relationship among output 12, input 10, and the combination of sun gear 86, sun gear 46, and sun gear 56.

As shown in Table 4, engaging the shift elements in combinations of three establishes ten forward speed ratios and one reverse speed ratio between input 10 and output 12. When the gear sets have tooth numbers as indicated in Table 3, the speed ratios have the values indicated in Table 4.

TABLE 4

|      | 62 | 64' | 68  | 70' | 72 | 74 | Ratio | Step |
|------|----|-----|-----|-----|----|----|-------|------|
| Rev  | X  |     |     | X   |    | X  | −3.18 | 63%  |
| 1st  | X  |     |     | X   | X  |    | 5.09  |      |
| 2nd  | X  |     | X   |     | X  |    | 3.50  | 1.46 |
| 3rd  | X  |     | X   | X   |    |    | 2.33  | 1.50 |
| 4th  | X  | X   | (X) |     |    |    | 1.89  | 1.24 |
| 5th  |    | X   | X   | X   |    |    | 1.49  | 1.27 |
| 6th  |    | X   | X   |     | X  |    | 1.14  | 1.30 |
| 7th  |    | X   |     |     | X  | X  | 1.00  | 1.14 |
| 8th  |    | X   | X   |     |    | X  | 0.82  | 1.21 |
| 9th  |    |     | X   |     | X  | X  | 0.69  | 1.20 |
| 10th |    |     | X   | X   |    | X  | 0.63  | 1.10 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A transmission comprising:
   a first gearing arrangement configured to selectively impose a proportional speed relationship between an input and an intermediate shaft;
   a second gearing arrangement configured to fixedly impose a linear speed relationship among the input, a first shaft, and a second shaft;
   a third gearing arrangement configured to fixedly impose a linear speed relationship among a third shaft, an output, a fourth shaft, and the second shaft;
   first, second, and third clutches configured to selectively couple the intermediate shaft to the first shaft, the second shaft, and the third shaft;
   a fourth clutch configured to selectively couple the input to the fourth shaft; and a brake configured to selectively hold the third shaft against rotation.

2. The transmission of claim 1 wherein the first gearing arrangement comprises a first simple planetary gearset having a first sun coupled to a transmission case, a first carrier coupled to the input, and a first ring coupled to the intermediate shaft.

3. The transmission of claim 2 wherein:
the first sun is fixedly coupled to the transmission case;
the first carrier is fixedly coupled to the input; and
the first ring is selectively coupled to the intermediate shaft by a fifth clutch.

4. The transmission of claim 1 wherein the second gearing arrangement comprises a second simple planetary gearset having a second sun as the second shaft, a second carrier as first shaft, and a second ring fixedly coupled to the input.

5. The transmission of claim 1 wherein the second gearing arrangement comprises:
a third simple planetary gearset having a third sun as the second shaft, a third carrier fixedly coupled to the output, and a third ring as the third shaft; and
a fourth simple planetary gearset having a fourth sun fixedly coupled to the third sun, a fourth carrier as the fourth shaft, and a fourth ring fixedly coupled to the output.

6. A transmission comprising:
gearing fixedly imposing
a proportional speed relationship between an input and a first shaft,
a linear speed relationship among the input, a second shaft, and a third shaft, and
a linear speed relationship among the third shaft, an output, and a fourth shaft; and
four clutches configured to selectively couple an intermediate shaft to the first shaft, the second shaft, the third shaft, and the fourth shaft respectively.

7. The transmission of claim 6 wherein the gearing comprises a first simple planetary gearset having a first sun fixedly coupled to a transmission case, a first carrier fixedly coupled to the input, and a first ring as the first shaft to fixedly impose the proportional speed relationship between the input and the first shaft.

8. The transmission of claim 6 wherein the gearing comprises a second simple planetary gearset having a second sun as the third shaft, a second carrier as the second shaft, and a second ring fixedly coupled to the input to fixedly impose the linear speed relationship among the input, the second shaft, and the third shaft.

9. The transmission of claim 6 wherein the gearing comprises a double pinion planetary gearset having a second sun as the third shaft, a carrier fixedly coupled to the input, and a second ring as the second shaft to fixedly impose the linear speed relationship among the input, the second shaft, and the third shaft.

10. The transmission of claim 6 wherein the gearing comprises a third simple planetary gearset having a third sun as the third shaft, a third carrier fixedly coupled to the output, and a third ring as the fourth shaft to fixedly impose the linear speed relationship among the third shaft, the output, and the fourth shaft.

11. The transmission of claim 6 further comprising additional gearing and a fifth clutch configured to selectively impose a linear speed relationship among the third shaft, the input, and the output.

12. The transmission of claim 11 wherein the additional gearing comprises a fourth simple planetary gearset having a fourth sun as the third shaft, a fourth carrier selectively coupled to the input by the fifth clutch, and a fourth ring fixedly coupled to the output.

13. The transmission of claim 11 wherein the additional gearing comprises a fourth simple planetary gearset having a fourth sun as the third shaft, a fourth carrier fixedly coupled to the input, and a fourth ring selectively coupled to the output by the fifth clutch.

14. The transmission of claim 11 further comprising a brake configured to selectively hold the fourth shaft against rotation.

15. A transmission comprising:
four gearsets wherein
a first sun is fixedly held against rotation,
second, third, and fourth suns are mutually fixedly coupled,
a first carrier and a second ring are fixedly coupled to an input, and
a third carrier and a fourth ring are fixedly coupled to an output; and
four clutches configured to selectively couple an intermediate shaft to a first ring, a second carrier, the second sun, and a third ring respectively.

16. The transmission of claim 15 further comprising a brake configured to selectively hold the third ring against rotation.

17. The transmission of claim 16 further comprising a fifth clutch configured to selectively couple a fourth carrier to the input.

* * * * *